Patented Feb. 3, 1948

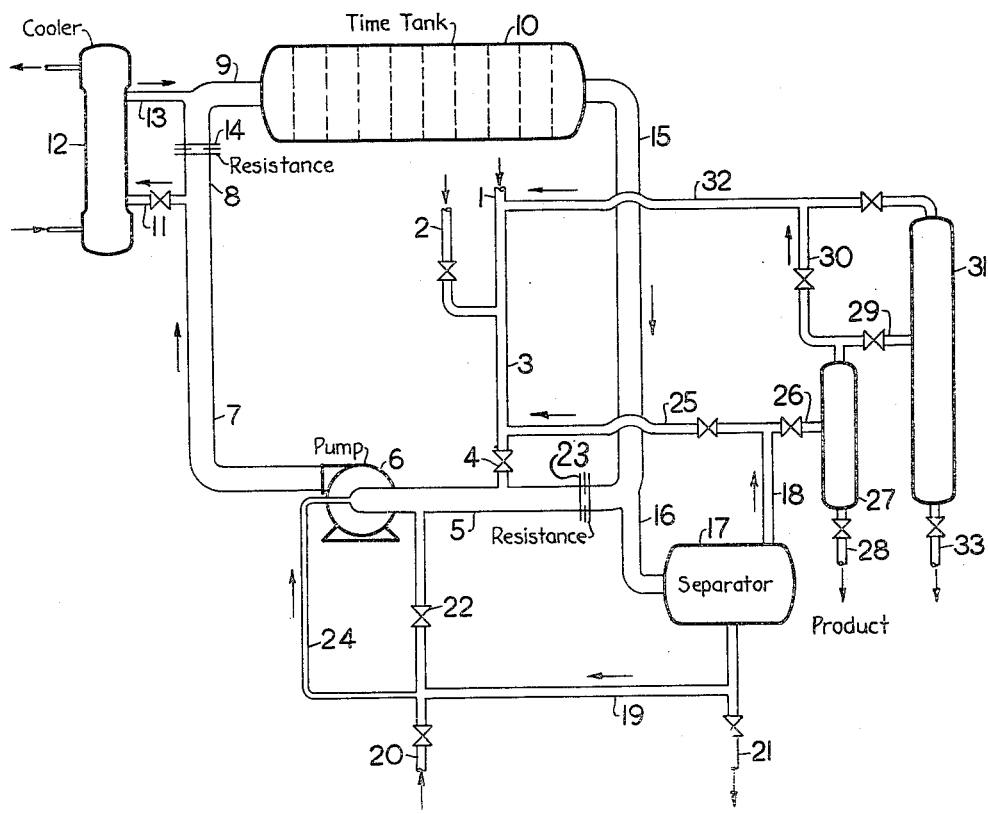

2,435,402

UNITED STATES PATENT OFFICE 2,435,402

PRODUCTION OF MOTOR FUELS

Sumner H. McAllister, Lafayette, and Edwin F. Bullard, Oakland, Calif., assignors to Shell Development Company, San Francisco, Calif., a corporation of Delaware Application December 14, 1938, Serial No. 245,714

13 Claims. (Cl. 260—683.4)

This invention relates to a low temperature process for reacting isoparaffins with olefines in the liquid phase in the presence of catalyst acid, particularly sulphuric acid, to form higher boiling hydrocarbons. It deals particularly with a new and more efficient method for carrying out such reactions in a continuous manner in which undesirable side reactions may be minimized.

An important object of our invention is the provision of a continuous process for reacting isoparaffins with olefines in which the effective life of the catalyst acid is unusually long and its cost correspondingly low. Another object of the process of our invention is to provide a simple method whereby a high ratio of isoparaffin to olefine may be continuously maintained in the reaction zone and accumulation of olefine in the reactor avoided. Still another object of our invention is to prevent undesirable reactions of the olefine used especially hydration, esterification and polymerization reactions. A further object of our novel process is to reduce to a minimum the power required for dispersing the reactants in the catalyst acid while insuring complete, uniform and intimate dispersion. It is also an object of our invention to provide a method of operation which makes practical high rates of production per volume of reaction space.

The process of our invention provides an especially advantageous method for reacting lower boiling isoparaffins such as isobutane and isopentane with normally gaseous olefines such as propylene, normal and/or isobutylenes to form paraffins which boil within the gasoline range and have a high anti-knock value. It will be understood, however, that our new reaction method is not limited to these specific reactions but may advantageously be used in the manufacture of other branched chain saturated compounds by reacting saturated hydrocarbons having a hydrogen atom attached to a tertiary carbon atom, whether normally gaseous or liquid, such for example as 2-methyl pentane, 2,3-dimethyl butane, 2,2,3-trimethyl butane, 3-ethyl pentane, methylcyclopentane or suitable substitution products thereof such for example as monochlorides corresponding thereto or the like, with the same or other olefines. Olefines which may be reacted with such compounds in accordance with the process of our invention include, in addition to propylene and the butylenes, alpha and beta amylene, isopropyl-ethylene, trimethyl ethylene, unsymmetrical methyl ethyl ethylene, isobutyl-ethylene, isooctylenes, cyclopentene, cyclohexene, butadiene, cyclohexadiene, or the corresponding unsaturated chlorides, and the like. The reactants may be used in a pure state as a mixture of one or more isoparaffins with one or more olefines or as such mixtures containing other components which may or may not be inert under the reaction conditions but which are such that they do not interfere with the desired reaction between the isoparaffin or isoparaffins and the olefine or olefines being reacted. Thus hydrogen, nitrogen, methane, ethane, propane, normal butane, tetramethyl methane, ethylene and the like, for example, may be present. Particularly advantageous sources of isoparaffins and olefines which may be reacted in accordance with the process of our invention are hydrocarbons derived from petroleum, petroleum products, shale oils, coal peat, animal or vegetable oils or like carboniferous materials. The isoparaffins and/or olefines present in the starting material may be of natural occurrence, the result of catalytic dehydrogenation, cracking or other pyrogenetic treatment. Cracked petroleum distillates or special fractions thereof, particularly hydrocarbon fractions consisting of, or predominating in, hydrocarbons containing the same number of carbon atoms per molecule, may be used although non-isomeric mixtures are also suitable. Such hydrocarbon fractions or mixtures may advantageously be subjected to a polymerization treatment prior to their treatment in accordance with the process of the present invention. For example, the mixture may be first treated to interpolymerize tertiary olefines with secondary olefines and the residual hydrocarbon containing isoparaffin and olefines, generally principally secondary olefine or olefines used as starting material for our process. Copending application Serial No. 133,203 of Sumner H. McAllister filed March 26, 1937 now United States Patent 2,174,247, describes an especially advantageous method for carrying out such a preliminary interpolymerization step. Alternatively tertiary olefine or olefines may be selectively polymerized in part or substantially quantitatively prior to carrying out the present process with the residual isoparaffin and olefine content. United States Patents 1,938,177; 2,007,159 and 2,007,160 describe suitable methods for carrying out the preliminary removal of tertiary olefines. Whatever the preliminary polymerization treatment used, the present process may be carried out with the remaining isoparaffin whether or not the olefine polymers are first separated therefrom.

While we do not wish to be limited to any particular theory with respect to the present invention, the following explanation of the process of our invention will assist in making clear its method of operation and in explaining the highly advantageous results attained. The isoparaffin is considered as the less reactive molecule and the olefine as the more reactive molecule involved in the process of our invention. In the presence of an acid catalyst, such as sulphuric acid of at least 90% concentration or its equivalent, the olefine can be made to react with the isoparaffin. The reaction may be considered as taking place in the acid phase. The olefine can also readily react with the acid to form mono- or di-sulphates or alcohols or ethers or with other molecules of the same or other olefines if present to form co- or interpolymers. These side reactions, particularly those of the olefine with the acid are undesirable not only because they reduce the yield of isoparaffin reaction products but also because they very seriously impair the life of the catalyst. Relatively small amounts of olefine are capable of leading to rapid deterioration of the acid catalyst. Olefines are absorbed by catalyst acids at enormously faster rates than are isoparaffins. For example, the rates of absorption of alpha and beta butylenes in 97% sulphuric acid at 25° C. are about 620 and 740 times, respectively, that of isobutane. This greatly increases the difficulty of protecting the catalyst acid from undesirable olefine absorption. We have found, however, that the rate of absorption of olefine may be materially reduced by proper dilution of the olefine and that it is particularly desirable to dilute the olefine feed with the isoparaffin to be used in the reaction as in this way longer catalyst acid life is possible. At the same time it is highly advantageous to provide conditions favorable for high rates of isoparaffin absorption, such as strong acid solutions, and in particular by having large amounts of isoparaffin, preferably in high concentration, present in the reaction zone. Merely having an excess of isoparaffin present is alone not sufficient to insure a long catalyst life and provision should be made for substantially complete reaction of the olefine in order that there may be no accumulation of olefine in the system. We have discovered that, contrary to previously held ideas, the reaction between isoparaffins and olefines to form higher boiling saturated hydrocarbons can be made a relatively rapid one.

Based on these discoveries we have developed an efficient, technically practical method for continuously reacting isoparaffins with olefines which gives long catalyst life and extremely high rates of production per volume of reaction space while insuring high yields of uniformly high quality products. In our process the ratio of isoparaffin to olefine in the reaction zone is advantageously maintained higher than that in the feed. This more favorable reaction condition is achieved by recycling a part of the reacted mixture rich in isoparaffin, but substantially free from olefines, to mix with the feed as it enters the reactor. In our preferred method of carrying out our process we advantageously operate with two stages of dilution of the olefinic feed, first diluting the olefine feed stock with isoparaffin-containing hydrocarbon before bringing it into contact with the catalyst acid and then adding this mixture to recycled reaction mixture of dispersed catalyst and isoparaffin-containing hydrocarbon which is substantially olefine-free. In any case we prefer to operate with a high concentration of the isoparaffin which it is desired to react in contact with the catalyst acid and present in excess over the olefine used. By this method of operation and the proper adjustment of contact time, acid strength, temperature and acid to hydrocarbon ratio complete reaction of the olefine is readily achieved and we find it feasible to so operate that in the reactor proper the olefine concentration is so low that it is not measurable by existing analytical methods. To this end, it is highly advantageous to provide thorough, uniform, positive mixing of a small amount of olefine in a large amount of isoparaffin so that no short circuiting or accumulation of olefine anywhere in the system takes place.

While other methods of operation may be used without departing from the spirit of our invention, the accompanying drawing illustrates, diagrammatically, one assembly of apparatus particularly suitable for large scale application of the process of our invention, in which optimum reaction conditions can be readily maintained. In the drawing pipe lines 1 and 2 are supply lines for isoparaffin and olefine containing hydrocarbon, respectively, from sources not shown, which are mixed in line 3. The rate of feed of the resulting mixture may be regulated by adjustment of valve 4. In line 3 the isoparaffin and olefine feed may be diluted with isoparaffin containing hydrocarbon introduced through lines 25 and/or 32. The feed from pipe 3 is introduced into line 5 where it contacts recycled reaction mixture comprising catalyst acid, preferably sulphuric acid, and unreacted isoparaffin. It is highly desirable that the mixing at this point be as thorough and rapid as possible. Line 5 is in communication with positive circulating means such as pump 6 which passes a part of the mixture of hydrocarbon and catalyst by lines 7, 8 and 9 to a means for maintaining the mixture in a dispersed condition until reaction is substantially complete which may take the form of time tank 10 or the like. A branch line 11 leading to cooler 12 permits cooling sufficient of the reaction mixture by indirect heat transfer to a suitable cooling medium, to bring the temperature of the entire mixture to the desired point after reintroduction of the cooled portion via line 13 connecting cooler 12 with line 9. The amount of reaction mixture circulated through the cooler instead of via line 8 may be regulated by inserting a suitable resistance 14 which may take the form of an orifice plate or the like in line 8. The circulating stream of reaction mixture passes by line 9 to a time tank 10 which advantageously may be equipped with perforated plates so spaced that they provide a degree of turbulence sufficient to maintain the desired dispersion of catalyst acid and hydrocarbon throughout the time of residence of the mixture in the tank although suitably packed towers or coils of pipe of suitable diameter and length or other equivalent means may be used. From the time tank 10 the reaction circulates by line 15 to line 5 where it again contacts incoming isoparaffin and olefine feed from line 3. Before such contact, however, a side stream is withdrawn by line 16 to means for separating immiscible liquids such as stratifier 17 where stratification takes place and the upper, hydrocarbon layer is removed through pipe line 18. The lower, catalyst acid layer is returned to the circulation system by line 19 connecting separator 17 with line 5 at a point on the down stream side of, and advantageously substantially removed from, the point of connection of feed inlet line 3. The proportion of reaction mixture withdrawn to the separator is controlled by placing a definite resistance 23 in the recycle stream and by a throttle valve 22 in the line returning acid phase from the separator. It is helpful in the maintenance of the circulating pump stuffing box to allow this element to operate exclusively on hydrocarbon or on acid phase as it is difficult to provide materials equally resistant to both phases. Thus a line 24 may be provided whereby a part of the stream of acid from separator 17 can be taken off and used to seal the stuffing box of pump 6. Alternatively hydrocarbons can be used by directing part or all of the feed from lines 1 and 2 to the pump stuffing box.

It is a feature of the process of our invention, that the acid catalyst used is preferably preconditioned before the start of the reaction by being first saturated with olefine-free hydrocarbon, preferably hydrocarbon containing the isoparaffin to be used in the process. To this end, the apparatus, in starting operations, is first charged with isoparaffin containing hydrocarbons, free from olefine, and the required amount of catalyst acid, for example, sulphuric acid of 90 to 110% concentration, is then added. In general a ratio of about 0.2 to about 2 volumes of acid phase per volume of hydrocarbon phase may be used, although ratios of about 0.4 to about 1.2, such that the hydrocarbon constitutes the continuous phase in the resulting dispersion, are preferred as ease of dispersion is facilitated thereby, but higher and lower ratios may be used; although excessively high acid ratios which result in too great a decrease in the volume of hydrocarbon in the recycle stream are undesirable. With the dispersion of sulphuric acid and isoparaffin hydrocarbon flowing uniformly through the system, valve 4 is opened and the olefinic feed, preferably containing at least an equal molecular amount of isoparaffin and preferably containing an excess of isoparaffin, most preferably at least 3 molecules of isoparaffin per molecule of olefine is admitted through line 3. The rate of feed of reactants is preferably so adjusted with respect to the rate of flow of recycle stream through line 5, that the ratio of isoparaffin to olefine at the point of contact of acid and olefine is of the order of at least 20 to 1 and more preferably is at least 50 to 1. Ratios of about 100 to about 400 to 1 and higher may be used; it being only undesirable to employ such high ratios that the plant capacity is unnecessarily reduced.

In order to obtain high reaction rates, the sulphuric acid should be thoroughly mixed with the hydrocarbons present. The circulation rate should be such that the desired degree of mixing is maintained for sufficient time to allow the reaction of substantially all of the added olefine during one cycle of flow. It is highly desirable that no substantial recycling of unreacted olefine takes place. The proportion of reaction mixture diverted to cooler 12 and the degree of cooling therein are preferably adjusted so as to maintain a temperature of about 0° C. to about 35° C. preferably about 15° to 25° C. in time tank 10. One effect of recycling reaction mixture is to so increase the mass of liquid circulating through the time tank that only a small temperature rise results from the heat of reaction and of friction. Such heat can be removed efficiently at any one point and the cooler can be of the most efficient type and can be located in the main circulation stream instead of in a branch thereof as shown in the drawing, the choice of location depending upon the flow rates most suitable for the particular cooler used.

It is not essential to have complete separation of hydrocarbon and acid in separator 17 but it is highly advantageous to prevent removal of acid from the system with the hydrocarbon phase withdrawn through line 18. Should loss of acid occur in this or any other way, e. g. leakage, chemical reaction, etc., make up acid may be added, for example, through valved line 20 connecting line 19 with an acid supply not shown. It is desirable to continuously or intermittently replace a part of the acid in the system, which may be withdrawn thru valve controlled line 21, by fresh or suitably purified acid added thru line 20, although periodic draining of all the acid from the reactor and its replacement with fresh or purified acid, may also be used. Increased amounts of products boiling higher than the initial reaction product are usually associated with the falling off in conversion rate which is indicative of the desirability of replacing catalyst acid. Emulsification difficulties and sulphur dioxide evolution can be overcome by replacing catalyst acid.

The hydrocarbon phase withdrawn from separator 17 through pipe line 18 is conducted by line 26 to a distillation unit 27 for recovery of reaction product. Although it is not essential to the process of our invention, a part of the withdrawn hydrocarbon phase may advantageously be taken off by line 25 before such distillation and used to dilute the olefine-isoparaffin feed in line 3. In still 27, which may be of the flash distillation type, the higher boiling products formed in the reaction are taken off as bottoms thru line 28 while the unreacted hydrocarbon containing isoparaffin is removed by line 29. The unreacted hydrocarbon thus recovered may be returned to the reaction system, preferably with the olefinic feed as by lines 30 and 32. Where inert components are present these may advantageously be removed before returning the isoparaffin content to mix with the olefine feed. In the drawing the removal of inert components having a higher boiling point than the isoparaffin being used in the reaction, for example the removal of normal from isobutane, is illustrated. In such a case the overhead product from still 27 is fed to still 31 from which the isoparaffin is removed by line 32 and returned to pipe line 3 while the inert component or components are withdrawn from the system by line 33. It will be obvious that depending upon the boiling points, relative solubilities, etc. of the isoparaffin and inert material, other distillation methods or extraction or other suitable procedures may be used for removal of the inert material.

The particular combination of operating conditions to be used in any particular case will depend upon the isoparaffin and olefine or mixture thereof to be reacted. In all cases we prefer to operate under sufficient pressure to maintain the reactants in the liquid phase. We also prefer to use acid concentrations which are as high as possible in order to promote absorption of isoparaffin therein. With sulphuric acid catalysts the upper limit of acid concentration depends upon the temperature employed as too high a concentration of acid at too high a temperature leads to undesirable sulphonation reactions and the like. Fuming sulphuric acid at temperatures below 0° C. may be used. The tendency of sulphuric acid catalysts to cause sulphonation may be reduced by the use of phosphoric acid. Solutizers for the isoparaffin being reacted, such as benzene sulphonic acid and the like may be used with the catalyst acid as may also inorganic salts such as heavy metal sulphates which have a beneficial influence on the reaction. Sulphuric acid of less than about 90% concentration is preferably not used and for the reaction of isobutane with normal butylenes acid of about 96 to 110% concentration, preferably 98 to 102% is desirable. Temperatures between 35° C. and —20° C. are suitable. With the preferred 98 to 102% sulphuric acid a temperature of 0° C. to 10° C. is advantageous, higher temperatures being applicable with weaker acid and lower temperatures being desirable with more concentrated acid. The difference in reactivity of different isoparaffins does not appear to be as great as the difference in reactivity of the various olefines. Thus where the same olefine or olefines are used substantially the same reaction conditions may be successfully employed for the reaction of isopentane therewith as when isobutane is used. When isobutylene is substituted for beta-butylene, for example, on the other hand, it is advisable to alter the operating conditions to compensate for the much greater reactivity of the tertiary olefine. We prefer, when using highly reactive olefines to increase the ratio of isoparaffin to olefine used, particularly in the feed mixture to the reactor but also advantageously in the reactor as well. Where propylene is used feed stock are preferably avoided. We find it convenient to use the spent catalyst acid, preferably after dilution with water, e. g. to about 60 to 75% or lower, to remove such undesirable components from the feed stock but other suitable methods whether of the solvent extraction type or not may also be employed.

The following tables show the advantageous results obtainable by the process of our invention as applied to the reaction of isobutane with butylenes, and the effect of different operating conditions thereon. The reactions were carried out in a bronze turbo mixer of 1160 cc. capacity provided with a cooling coil through which cold acetone was circulated at a sufficient rate to maintain the desired temperature. The mixer was provided with inlet lines for isoparaffin-olefine feed and returned acid and a draw-off line leading to a stratifier from which upper hydrocarbon phase was continuously removed while lower acid phase was taken off by the acid return line. The isoparaffin and olefine for reaction were continuously fed to the reactor under a pressure of about 150 to 200 lbs./sq. in. gauge, at a rate controlled by a thermo flow meter. Hydrocarbon phase was withdrawn from the separator at the same rate and distilled and the reaction product and unreacted hydrocarbon recovered and analyzed. In all cases the acid used as catalyst was saturated with isobutane free from olefine before the start of the run. The effect of premixing the olefine feed with isoparaffin is shown in Table I.

*Table I*

| Exp. No | 22 | 27 | 28 | 36 |
|---|---|---|---|---|
| Mols of isobutane added to the feed per mol of butylene fed. | 2.3 | 4.8 | 4.8 | 4.8. |
| Olefine concentration of mixture fed. | 13.7% | 14.1% | 14.1% | 14.0%. |
| Sulphuric acid catalyst concentration (wt. % H₂SO₄). | 96 | 96.9 | 96.4 | 96.3. |
| Volume ratio of acid to hydrocarbon. | 0.7/1 | 0.7/1 | 0.7/1 | 0.7/1. |
| Temperature | 20° | 20° | 20° | 20°. |
| Feed rate (cc. of hydrocarbon/min.). | 30/35 | 30/35 | 60/70 | 90/100. |
| Contact time | 20 min | 20 min | 10 min | 7 min. |
| Yield as per cent of olefine fed | 148 | 148 | 201 | 183. |
| Volumes of product/volume of acid. | 6.75 | 11.5 | 8.75 | 18.5. |
| Percent of product boiling between 24° and 132° C: | | | | |
| Initially | 82 | 93 | 91.5 | 87.5. |
| After 3 vols. of product/vol. of acid. | 75 | | | |
| After 6.75 vols. of product/vol. of acid. | 31.5 | 91.5 | 89.8 | 86.7. |
| After 8.75 vols. of product/vol. of acid. | | 90.75 | 86 | 86. |
| Condition of catalyst at end of test. | Almost completely spent. | Very active. Apparently not more than half its effective life utilized. | Very active. Capable of producing about 9 more vols. of product. | Substantially although still not completely spent. | as one of the reactants due allowance must be made for its different reactivity. When olefinic mixtures such as are obtained in Dubbs' cracking processes are used the conditions should be adjusted with particular reference to the more reactive olefine present. The differences in reactivity of secondary olefines of six or more carbon atoms per molecule are not so pronounced and it has been found satisfactory to react cracked gasoline with isobutane to obtain a saturated gasoline of high anti-knock value by using conditions quite similar to those employed when reacting isobutane with butylenes.

Presence of alcohols, ethers, ketones, etc., which tend to split off H₂O in the presence of H₂SO₄ is undesirable because of the diluting effect of such decomposition product on the acid. Likewise nitrogen bases, such as amines, etc. in the These results show the advantage of feeding a high ratio of isoparaffin to olefine, it being apparent that doubling the ratio of isobutane to butylene in the feed under otherwise similar conditions not only greatly increases the yield (from 6.75 to an estimated 23 volumes of product per volume of acid) and gives better yields (192% compared with 148% based on the amount of olefine used) of better quality products but also makes feasible production rates not feasible when the lower isoparaffin to olefine ratios are used. The importance of having a high ratio of isoparaffin to olefine in the feed is clearly brought out by a comparison of the figures in columns one and four of Table I which are results of tests in which the ratios of isoparaffin to olefine in the reactor were approximately the same, the lower isoparaffin-olefine ratio in the first case being nearly compensated for by the lower recycle ratio of the latter. We consider it particularly advantageous to maintain a high concentration, suitably at least 40% and more preferably 50% or higher, of the isoparaffin or isoparaffins being reacted, in the hydrocarbon phase of the reaction mixture.

In Table II the effect of acid concentration and temperature on the reaction of isobutane with a butylene mixture containing beta butylene as the predominating olefine together with smaller amounts of iso and alpha-butylene, is shown.

quently the opportunity for short circuiting is definitely limited. Also the primary mixing is confined to a limited region in which the mixing is positive, easily controlled, rapid and thorough. It provides a simple method for maintaining a high concentration of isoparaffin in the reaction mixture whereby the catalyst acid may be kept substantially saturated with isoparaffin and so protected from undesirable reaction with the olefine. It also provides for a low concentration of primary reaction product in the reaction mixture which makes possible higher yields of such desirable products by reducing the opportunity for

Table II

| Exp. No. | 34 | 29 | 33 | 25 | 30 | 31 | 37 |
|---|---|---|---|---|---|---|---|
| Mols of isobutane added to the feed per mol of butylene fed. | 4.9 | 4.8 | 4.9 | 4.9 | 4.9 | 4.9 | 4.8. |
| Olefine concentration of mixture fed | 10.9 | 11.3 | 10.9 | 10.9 | 11.0 | 10.9 | 11.1. |
| Sulphuric acid catalyst conc. (wt. % $H_2SO_4$) | 92.1% | 94 | 95.8 | 100 | 96.7 | 98 | 100. |
| Volume ratio of acid to hydrocarbon | 0.7/1 | 0.7/1 | 0.7/1 | 0.7/1 | 0.7/1 | 0.7/1 | 0.7/1. |
| Temperature | 20° C | 20° C | 20° C | 20° C | 20° C | 20° C | 10° C. |
| Feed rate (cc. of hydrocarbon/min.) | 30–35 | 30–35 | 30–35 | 30–35 | 60–70 | 60–70 | 30–35. |
| Contact time | 20 min | 20 | 20 | 20 | 10 | 10 | 20. |
| Yield as per cent of olefine fed | 112 | 153 | 180 | 212 | 180 | 222 | 216. |
| Volumes of Product/volume of acid | 1.67 | 10.32 | 16.32 | 9.43 | 9.70 | 12.96 | 9.97. |
| Per cent of product boiling between 24° and 132° C.: | | | | | | | |
| Initially | 29.1 | 80.5 | 89.5 | 95 | 80 | 90.7 | 95.2. |
| After 3 vols. of prod./vol. of acid | | 80.5 | 87.8 | 94.3 | 80.2 | 89.6 | 94.7. |
| After 6.75 vols. of prod./vol. of acid | | 69.1 | 84.0 | 91.3 | 72.4 | 87.7 | 94.3. |
| After 8.75 vols. of prod./vol. of acid | | 57.5 | 80.7 | 86.2 | 59.6 | 86.2 | 94.0. |
| End | 39.2 | 30 | 46.7 | 95.9 | 53.2 | 80.1 | 92.0. |
| Condition of catalyst at end of test | Spent | Spent | Spent | Still active | Spent | Still active | Still active. |

These results bring out the desirability of using strong acid and suppressing sulphonation by operating at low temperatures. They also show the extremely long life of the catalyst when our method of operation is employed. The high production rates obtainable by our process are shown; for example, by the test reported in the last column of Table I, where the rate of production of higher boiling hydrocarbon was 1.01 volumes per hour per volume of reaction space.

It will thus be evident that our process for reacting isoparaffins with olefines offers many advantages particularly in efficiency of operation and economy of catalyst acid. It not only provides a simple method, recycling of reacted mixture, for maintaining a high ratio of isoparaffin to olefine but also permits of thorough mixing and the maintenance of the reaction mixture in a highly dispersed condition, at which the rate of reaction is high, for sufficient time to allow the reaction of the olefine to go to completion. Furthermore, the power required for maintaining such dispersion may be supplied by a pump of high efficiency in which the wear, which is a function of the power losses within the pump, is low, the power imported by the pump to the circulating mixture being converted into dispersing effect in the reactor, e. g. at the perforated plates of the time tank, and also advantageously in substantial amount at the juncture of lines 3 and 5. Our system provides ready control of the volumetric ratio of catalyst acid and hydrocarbon phases, since by the removal of product from the system without removing acid a definite constant quantity of the latter is maintained in the system. In this way operation in the preferred range of continuous hydrocarbon phase where greater opportunity for diffusion of reactants exists is readily maintained. In our preferred form of reaction system the feed inlet and product outlet points are separated by time tank elements or pipe coils or the like, the feed most preferably entering the recycle stream directly after the point of offtake of the separator branch, and consefurther reaction between the product and more olefine. All of these factors contribute to make our new process highly efficient and economical and make its products superior in quality.

While we have described our invention in a detailed manner and illustrated suitable means of carrying it out it will be understood that variations may be made not only in regard to the isoparaffins and olefines which may be reacted and the catalyst acid used therewith but also with respect to the details of operation used. For example, while addition of isoparaffin to the olefinic feed has been described as our preferred method of operation, it is also possible to make such addition to the reaction mixture separately so as to maintain therein the desired high concentration of isoparaffin. Also instead of using the process for the primary production of relatively low boiling isoparaffins by reaction of one molecule of olefine with one molecule of isoparaffin, higher boiling products may be prepared by maintaining such a high concentration of such primary products in the mixture that their further reaction with another molecule of olefine is promoted. While emphasis has been placed on our preferred method of continuous operation it will be obvious that many features of our invention are also highly advantageous when operating intermittently or batch-wise. Again where return of unreacted hydrocarbon containing normal paraffins substantially inert under the conditions of our reaction has been described, it will be understood that in many cases such compounds can be advantageously isomerized, for example by passing their vapors over aluminum chloride catalyst at an elevated temperature, either after separation of such compounds in still 31 or not, before such return to the system, and the resulting isoparaffins used in our process. Still other modifications may be made in the process of our invention consequently no limitations other than those imposed by the scope of the appended claims are intended.

The herein disclosed method of alkylating an isoparaffin with an olefine in the presence of an alkylation catalyst while maintaining the ratio of said isoparaffin to olefine at the point where the olefine initially contacts the catalyst at least 50 to 1, preferably above 100 to 1, and simultaneously maintaining the concentration of the isoparaffin in the hydrocarbon phase of the reaction mixture above 50%, preferably above 60%, by liquid volume of the hydrocarbons, is claimed in copending application Serial No. 671,988, filed May 24, 1946, as a division of the present application.

We claim as our invention:

1. A process of producing an alkylation product from an isoparaffin and a mono-cyclic olefin having 5 to 6 carbon atoms in the ring which comprises contacting an excess of isoparaffin, said cyclic olefin and concentrated sulfuric acid under alkylation conditions at which reaction between said isoparaffin and olefin takes place and a saturated hydrocarbon is produced.

2. A process of producing an alkylation product from an alkyl cycloparaffin and a mono-cyclic olefin having 5 to 6 carbon atoms in the ring which comprises contacting said cyclic olefin, an excess of said cycloparaffin and concentrated sulfuric acid under alkylation conditions at which reaction between said cyclic paraffin and olefin takes place and a saturated hydrocarbon is produced.

3. A process of producing an alkylation product from an alkyl cycloparaffin and an olefin which comprises contacting said olefin, an excess of alkyl cycloparaffin and concentrated sulfuric acid under alkylation conditions at which reaction between said cyclic paraffin and olefin takes place and a saturated hydrocarbon is produced.

4. A process for the production of an alkylated hydrocarbon which comprises reacting an isoparaffin with an aliphatic mono-olefinic hydrocarbon chloride in the presence of concentrated sulfuric acid and correlating the amount and concentration of sulfuric acid and the proportion of isoparaffin and aliphatic mono-olefinic hydrocarbon chloride to effect alkylation of the isoparaffin by said unsaturated chloride as the principal reaction.

5. In a process for reacting an isoparaffin with an olefin in the presence of concentrated sulfuric acid, the improvement which comprises adding to the sulfuric acid catalyst an amount of benzene sulfonic acid sufficient to promote alkylation of said isoparaffin by said olefin.

6. A process for alkylating a low boiling isoparaffin which comprises reacting said isoparaffin with an olefin in the presence of concentrated sulfuric acid and an aromatic sulfonic acid.

7. In a process for reacting an isobutane with an olefin of at least three carbon atoms per molecule in the presence of concentrated sulfuric acid, the improvement which comprises adding to the sulfuric acid catalyst sufficient of an aromatic sulfonic acid to promote alkylation of said isoparaffin by said olefin.

8. A process for the production of an alkylation product from an isoparaffin and an aliphatic olefinic chloride which comprises contacting an excess of isoparaffin and said olefinic chloride with an alkylation catalyst acid under alkylation conditions at which reaction between said isoparaffin and olefinic chloride takes place and a higher boiling branched chain saturated compound is produced.

9. A process for the production of an alkylation product from isobutane and an olefinic chloride which comprises contacting an excess of isobutane and said olefinic chloride with an alkylation catalyst comprising concentrated sulfuric acid under alkylation conditions at which reaction between isobutane and said olefinic chloride takes place and a branched chain saturated compound is produced.

10. A process for the production of an alkylation product from a monochlorinated isoparaffin and an olefinic compound of the group consisting of olefinic hydrocarbons and the corresponding unsaturated chlorides which comprises contacting said monochloride and olefinic compound with an alkylation catalyst acid under alkylation conditions at which reaction between said monochloride and olefinic compound takes place and a higher boiling branched chain saturated compound is produced.

11. Process of making isooctanes from isobutane and butene which comprises alkylating said isobutane with said butene in contact under alkylating conditions with a catalyst comprising concentrated sulfuric acid and phosphoric acid, said catalyst containing less than 10% of water.

12. In a process of alkylating a saturated tertiary carbon atom-containing hydrocarbon by reaction with an olefinic compound of the group consisting of olefinic hydrocarbons and the corresponding unsaturated chlorides in the presence of concentrated sulfuric acid, the improvement which comprises maintaining a circulating stream of a dispersion of catalyst acid and saturated tertiary hydrocarbon-containing reaction mixture, feeding into said stream of circulating dispersion said olefinic compound and a stoichiometric excess of saturated tertiary carbon atom-containing hydrocarbon, withdrawing a portion of the reacted dispersion while recycling remaining dispersion having the same composition to contact with the reactants, separating the withdrawn dispersion into a phase containing alkylation product and excess unreacted saturated tertiary carbon atom-containing hydrocarbon and an acid phase, dividing said separated alkylation product-containing phase into two streams each having the same composition, recycling one of said separated alkylation product-containing streams to mix with the feed of said olefinic compound before it contacts the acid whereby a substantially higher ratio of said saturated tertiary carbon atom-containing hydrocarbon to said olefinic compound is maintained at the point of contact of said olefinic compound with the acid than is present in the feed, fractionating the other of said alkylation product-containing streams to separate the alkylation product from the excess unreacted tertiary carbon atom-containing hydrocarbon present therein and returning the latter to mix with the feed.

13. In a process of alkylating a tertiary carbon atom-containing saturated compound of the group consisting of saturated hydrocarbons and monochlorides having a tertiary carbon atom by reaction with an olefinic hydrocarbon in the presence of an alkylation catalyst comprising concentrated sulfuric acid and a stoichiometric excess of said saturated tertiary carbon atom-containing compound, the improvement which comprises maintaining an emulsion of said catalyst acid and reaction hydrocarbon circulating in a reaction zone, feeding into said circulating stream the olefinic hydrocarbon together with a stoichiometric excess of the saturated tertiary carbon atom-containing compound to be alkylated, withdrawing a part of the reacted emulsion from the reaction zone while returning remaining emulsion to contact with said reactants in the reaction zone, separating the withdrawn emulsion into a phase containing alkylation product and excess unreacted saturated tertiary carbon atom-containing compound and an acid phase, dividing said separated alkylation product-containing phase into two streams each having the same composition, recycling one of said separated alkylation product-containing streams to mix with the feed of said olefinic compound before it contacts the acid whereby a substantially higher ratio of said saturated tertiary carbon atom-containing compound to said olefinic compound is maintained at the point of contact of said olefinic compound with the acid than is present in the feed, and recovering the alkylation product from the other of said alkylation product-containing streams.

SUMNER H. McALLISTER.
EDWIN F. BULLARD.

REFERENCES CITED

The following references are of record in the file of this patent:

UNITED STATES PATENTS

| Number | Name | Date |
| --- | --- | --- |
| 376,688 | Trade-Mark | Apr. 2, 1940 |
| 2,001,910 | Ipatieff | May 21, 1935 |
| 2,161,392 | Stevens et al. | June 6, 1939 |
| 2,169,809 | Morrell | Aug. 15, 1939 |
| 2,211,747 | Goldsby et al. | Aug. 13, 1940 |
| 2,396,486 | Ballard | Mar. 12, 1946 |

FOREIGN PATENTS

| Number | Country | Date |
| --- | --- | --- |
| 479,345 | Great Britain | Jan. 31, 1938 |
| 824,329 | France | Nov. 10, 1937 |